(12) United States Patent
Wang et al.

(10) Patent No.: US 9,097,192 B2
(45) Date of Patent: Aug. 4, 2015

(54) METHOD AND APPARATUS FOR IDENTIFYING GAS SENSOR FAULTS

(75) Inventors: Da Yu Wang, Troy, MI (US); David M. Racine, Grand Blanc, MI (US); David D. Cabush, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 853 days.

(21) Appl. No.: 13/047,888

(22) Filed: Mar. 15, 2011

(65) Prior Publication Data
US 2012/0234077 A1    Sep. 20, 2012

(51) Int. Cl.
| | |
|---|---|
| H03F 1/26 | (2006.01) |
| F02D 41/14 | (2006.01) |
| F02D 41/22 | (2006.01) |
| F01N 3/20 | (2006.01) |
| F01N 11/00 | (2006.01) |

(52) U.S. Cl.
CPC .......... *F02D 41/1441* (2013.01); *F02D 41/222* (2013.01); *F01N 3/2066* (2013.01); *F01N 11/00* (2013.01); *F01N 2560/02* (2013.01); *F02D 41/1446* (2013.01); *F02D 41/1461* (2013.01); *F02D 41/1494* (2013.01); *F02D 2041/1433* (2013.01); *F02D 2041/1468* (2013.01); *F02D 2041/228* (2013.01); *Y02T 10/40* (2013.01)

(58) Field of Classification Search
CPC ..................................................... G01M 15/10
USPC ....................................................... 702/189
See application file for complete search history.

(56) References Cited

U.S. PATENT DOCUMENTS

| | | | |
|---|---|---|---|
| 5,392,643 A | 2/1995 | O'Kennedy et al. | |
| 6,576,587 B2 | 6/2003 | Labarge et al. | |
| 6,701,282 B2 * | 3/2004 | Ting et al. | ...... 702/185 |
| 7,240,484 B2 * | 7/2007 | Li et al. | ............ 60/286 |
| 7,610,750 B2 | 11/2009 | Viola et al. | |
| 7,623,028 B2 * | 11/2009 | Kates | ............ 340/521 |
| 2007/0271908 A1 | 11/2007 | Hemingway et al. | |
| 2008/0110769 A1 * | 5/2008 | Wang et al. | ........... 205/781 |
| 2010/0032292 A1 | 2/2010 | Wang et al. | |
| 2010/0032318 A1 | 2/2010 | Wang et al. | |
| 2010/0101214 A1 * | 4/2010 | Herman et al. | ......... 60/277 |
| 2010/0101215 A1 | 4/2010 | Wu et al. | |
| 2010/0326165 A1 * | 12/2010 | Rauworth et al. | ......... 73/1.06 |

OTHER PUBLICATIONS

U.S. Appl. No. 12/974,266, filed Dec. 21, 2010, "Method and Device for Characterization and Sensing of Exhaust Gas and Control of Engines and Components for Aftertreatment of Exhaust Gases".

* cited by examiner

*Primary Examiner* — Tung S Lau
*Assistant Examiner* — Xiuquin Sun
(74) *Attorney, Agent, or Firm* — Mark H Svoboda (57) ABSTRACT

A method for fault identification of gas sensors exposed to a gas mixture is disclosed for gas sensors having an output that depends on concentrations of two gas species in the gas mixture. The method includes receiving output signals from two such sensors, processing the output signals in a controller that implements a model of the sensors so as to identify a fault in the first gas sensor or the second gas sensor; and providing an indication of any identified faults.

15 Claims, 5 Drawing Sheets

METHOD AND APPARATUS FOR IDENTIFYING GAS SENSOR FAULTS

BACKGROUND OF THE INVENTION

The relevant background includes the fields of exhaust gas treatment systems and diagnostics therefore. As to the former field of endeavor, there have been a variety of exhaust gas treatment systems developed in the art to minimize emission of undesirable constituent components of engine exhaust gas. It is known to reduce NOx emissions using a selective catalytic reduction (SCR) system, a treatment device that includes a catalyst and a system that is operable to inject material such as ammonia ($NH_3$) into the exhaust gas feedstream ahead of the catalyst. The SCR catalyst is constructed so as to promote the reduction of NOx by $NH_3$ (or other reductant, such as aqueous urea which undergoes decomposition in the exhaust to produce $NH_3$). $NH_3$ or urea selectively combine with NOx to form $N_2$ and $H_2O$ in the presence of the SCR catalyst, as described generally in U.S. Patent Application Publication 2007/0271908 entitled "ENGINE EXHAUST EMISSION CONTROL SYSTEM PROVIDING ON-BOARD AMMONIA GENERATION", the contents of which are incorporated by reference. For diesel engines, for example, selective catalytic reduction (SCR) of NOx with ammonia is perhaps the most selective and active reaction for the removal of NOx in the presence of excess oxygen. The $NH_3$ source must be periodically replenished and the injection of $NH_3$ into the SCR catalyst requires precise control. Overinjection may cause a release of $NH_3$ ("slip") out of the tailpipe into the atmosphere, while underinjection may result in inadequate emissions reduction (i.e., inadequate NOx conversion to $N_2$ and $H_2O$).

These systems have been amply demonstrated in the stationary catalytic applications. For mobile applications where it is generally not possible (or at least not desirable) to use ammonia directly, urea-water solutions have been proven to be suitable sources of ammonia in the exhaust gas stream. This has made SCR possible for a wide range of vehicle applications.

Increasingly stringent demands for low tail pipe emissions of NOx have been placed on heavy duty diesel powered vehicles. Liquid urea dosing systems with selective catalytic NOx reduction (SCR) technologies have been developed in the art that provide potentially viable solutions for meeting current and future diesel NOx emission standards around the world. Ammonia emissions may also be set by regulation or simply as a matter of quality. For example, proposed future European emission standards (e.g., EU 6) for $NH_3$ slip targets specify 10 ppm average and 30 ppm peak. However, the challenge described above remains, namely, that such treatment systems achieve maximum NOx reduction (i.e., at least meeting NOx emissions criteria) while at the same time maintaining acceptable $NH_3$ emissions, particularly over the service life of the treatment system.

In addition to the substantive emissions standards described above, vehicle-based engine and emission systems typically also require various self-monitoring diagnostics to ensure tailpipe emissions compliance. In this regards, U.S. federal and state on-board diagnostic regulations (e.g., OBDII) require that certain emission-related systems on the vehicle be monitored, and that a vehicle operator be notified if the system is not functioning in a predetermined manner. Automotive vehicle electronics therefore typically include a programmed diagnostic data manager or the like service configured to receive reports from diagnostic algorithms/circuits concerning the operational status of various components or systems and to set/reset various standardized diagnostic trouble codes (DTC) and/or otherwise generate an alert (e.g., MIL). The intent of such diagnostics is to inform the operator when performance of a component and/or system has degraded to a level where emissions performance may be affected and to provide information (e.g., via the DTC) to facilitate remediation.

Over the service life of the above-described exhaust treatment systems, various constituent components can wear, degrade or the like, possibly impairing overall performance. For example, degradation of either the SCR catalyst or the dosing system may impair the treatment system in meeting either or both of the NOx and $NH_3$ emission standards. Diagnostic methods to detect such conditions are described generally in U.S. Patent Application Publication 2010/0101214 entitled "DIAGNOSTIC METHODS FOR SELECTIVE CATALYTIC REDUCTION (SCR) EXHAUST TREATMENT SYSTEMS", the contents of which are incorporated by reference. However, improvements are always desirable in any art.

BRIEF SUMMARY OF THE INVENTION

In a first aspect of the invention, a method is presented for fault identification of gas sensors. The method includes receiving a first output signal from a first gas sensor having an output that varies according to both the concentration of a first gas species in a gas mixture and a second gas species in the gas mixture. The method further includes receiving a second output signal from a second gas sensor having an output that varies according to both the concentration of the first gas species in a gas mixture and the second gas species in the gas mixture. The method further includes processing the first output signal and the second output signal in a diagnostic controller that implements a model of the first gas sensor and a model of the second gas sensor so as to identify a fault in the first gas sensor or the second gas sensor.

In a second aspect of the invention, a fault identification system for gas sensors includes a first gas sensor having an output that varies according to both the concentration of a first gas species in a gas mixture and a second gas species in the gas mixture. The system further includes a second gas sensor having an output that varies according to both the concentration of the first gas species in a gas mixture and the second gas species in the gas mixture. The system further includes a diagnostic controller that implements a model of the first gas sensor and a model of the second gas sensor so as to identify a fault in the first gas sensor or the second gas sensor.

Further aspects of the invention will become apparent from the detailed description provided hereafter. It is to be understood that the detailed description and examples provided are intended for purposes of illustration and are not intended to limit the scope of the invention.

DETAILED DESCRIPTION OF THE INVENTION

Figure 1:
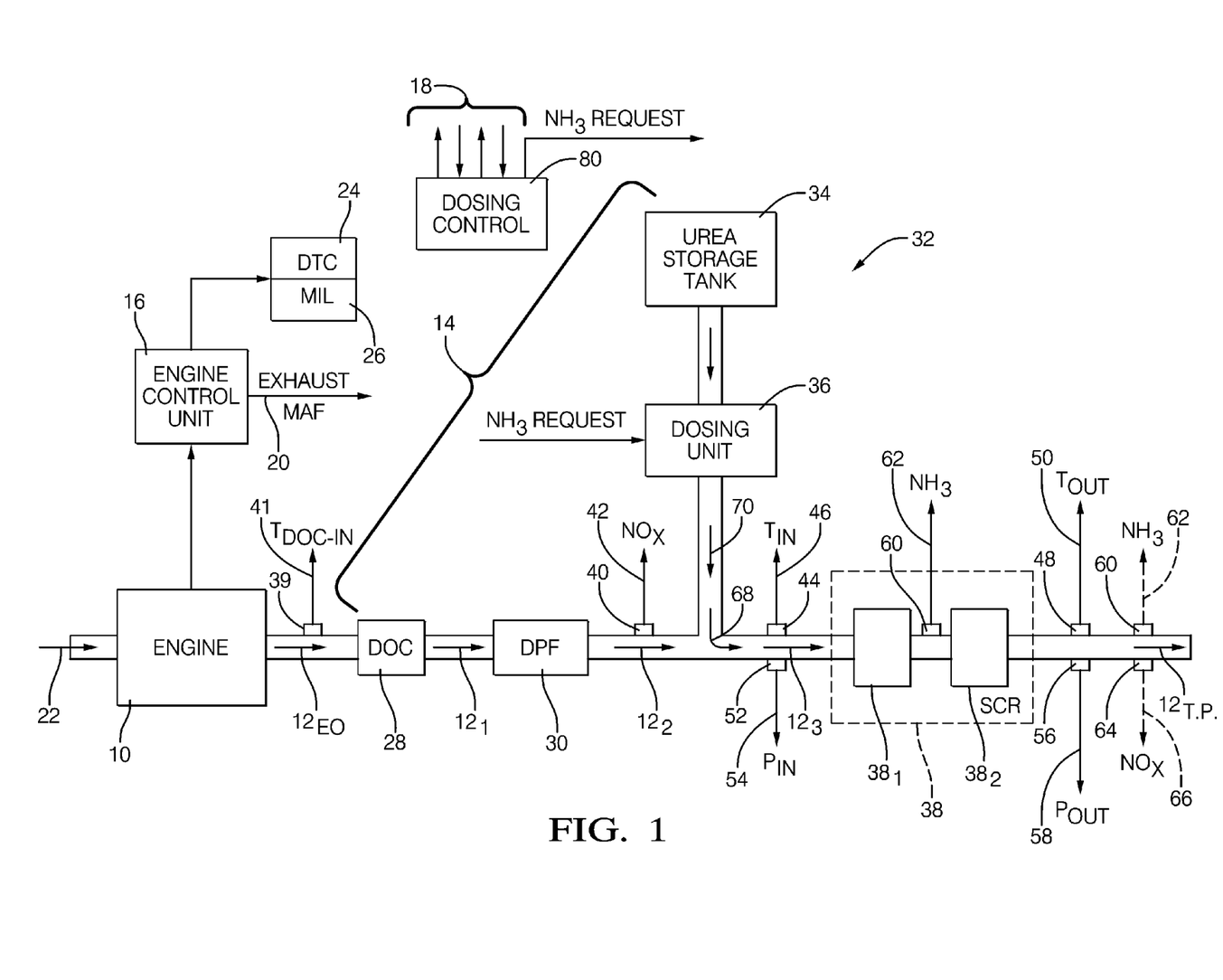
FIG. 1 is a diagrammatic and block diagram showing an exhaust treatment system in which the diagnostic methods of the invention may be practiced.

Referring now to the drawings wherein like reference numerals are used to identify identical components in the various views, FIG. 1 is a diagrammatic and block diagram showing an exemplary diesel cycle internal combustion engine 10 whose combustion exhaust gas 12 is fed to an exhaust gas treatment system 14. The exhaust gas is represented as a stream flowing through the exhaust gas treatment system 14 and is shown as a series of arrows designated $12_{EO}$ (engine out), $12_1$, $12_2$, $12_3$ and $12_{TP}$ (tail pipe). It should be understood that while the invention will be described in connection with an automotive vehicle (i.e., mobile) embodiment, the invention may find useful application in stationary applications as well. In addition, embodiments of the invention may be used in heavy-duty applications (e.g., highway tractors, trucks and the like) as well as light-duty applications (e.g., passenger cars). Moreover, embodiments of the invention may find further useful application in various types of internal combustion engines, such as compression-ignition (e.g., diesel) engines as well as spark-ignition engines.

In the illustrative embodiment, the engine 10 may be a turbocharged diesel engine. In a constructed embodiment, the engine 10 comprised a conventional 6.6-liter, 8-cylinder turbocharged diesel engine commercially available under the DuraMax trade designation. It should be understood this is exemplary only.

FIG. 1 also shows an engine control unit (ECU) 16 configured to control the operation of the engine 10. The ECU 16 may comprise conventional apparatus known generally in the art for such purpose. Generally, the ECU 16 may include at least one microprocessor or other processing unit, associated memory devices such as read only memory (ROM) and random access memory (RAM), a timing clock, input devices for monitoring input from external analog and digital devices and controlling output devices. The ECU 16 is operable to monitor engine operating conditions and other inputs (e.g., operator inputs) using the plurality of sensors and input mechanisms, and control engine operations with the plurality of output systems and actuators, using pre-established algorithms and calibrations that integrate information from monitored conditions and inputs. It should be understood that many of the conventional sensors employed in an engine system have been omitted for clarity. The ECU 16 may be configured to calculate an exhaust mass air flow (MAF) parameter 20 indicative of the mass air flow exiting engine 10.

The software algorithms and calibrations which are executed in the ECU 16 may generally comprise conventional strategies known to those of ordinary skill in the art. Overall, in response to the various inputs, the ECU 16 develops the necessary outputs to control the fueling (fuel injector opening, duration and closing) and other aspects of engine operation, all as known in the art.

In addition to the control of the engine 10, the ECU 16 is also typically configured to perform various diagnostics. For this purpose, the ECU 16 may be configured to include a diagnostic data manager or the like, a higher level service arranged to manage the reports received from various lower level diagnostic routines/circuits, and set or reset diagnostic trouble code(s)/service codes, as well as activate or extinguish various alerts, all as known generally in the art. For example only, such a diagnostic data manager may be pre-configured such that certain non-continuous monitoring diagnostics require that such diagnostic fail twice before a diagnostic trouble code (DTC) is set and a malfunction indicator lamp (MIL) is illuminated. As shown in FIG. 1, the ECU 16 may be configured to set a corresponding diagnostic trouble code (DTC) 24 and/or generate an operator alert, such an illumination of a MIL 26. Although not shown, in one embodiment, the ECU 16 may be configured so as to allow interrogation (e.g., by a skilled technician) for retrieval of such set DTCs. Generally, the process of storing diagnostic trouble codes and subsequent interrogation and retrieval is well known to one skilled in the art and will not be described in any further detailed.

With continued reference to FIG. 1, the exhaust gas treatment system 14 may include a diesel oxidation catalyst (DOC) 28, a diesel particulate filter (DPF) 30, a dosing subsystem 32 including at least (i) a reductant (e.g., urea-water solution) storage tank 34 and (ii) a dosing unit 36, and a selective catalytic reduction (SCR) catalyst 38. In addition, FIG. 1 shows various sensors disposed in and/or used by the treatment system 14. These include a DOC inlet temperature sensor 39 configured to generate a DOC inlet temperature signal 41 ($T_{DOC-IN}$), a first NOx sensor 40 configured to generate a first NOx signal 42 (NOx) indicative of a sensed NOx concentration, a first exhaust gas temperature sensor 44, located at the inlet of the SCR catalyst 38, configured to generate a first temperature signal 46 ($T_{IN}$), an optional second exhaust gas temperature sensor 48 configured to generate a second temperature signal 50 ($T_{OUT}$), a first pressure sensor 52 configured to generate a first pressure signal 54 ($P_{IN}$), a second pressure sensor 56 configured to generate a second pressure signal 58 ($P_{OUT}$), and an ammonia ($NH_3$) concentration sensor 60 configured to generate an ammonia concentration signal 62 indicative of the sensed $NH_3$ concentration. In many commercial vehicles, a second NOx sensor 64 is provided for generating a second NOx signal 66 indicative of the NOx concentration exiting the tail pipe. However, such is shown for completeness only.

The DOC 28 and the DPF 30 may comprise conventional components to perform their known functions.

The dosing subsystem 32 is responsive to an $NH_3$ Request signal produced by a dosing control 80 and configured to deliver a NOx reducing agent at an injection node 68, which is introduced in the exhaust gas stream in accurate, controlled doses 70 (e.g., mass per unit time). The reducing agent ("reductant") may be, in general, (1) $NH_3$ gas or (2) a urea-water solution containing a predetermined known concentration of urea. The dosing subsystem 32 is shown in block form for clarity and may comprise a number of sub-parts, including but not limited to a fluid delivery mechanism, which may include an integral pump or other source of pressurized transport of the urea-water solution from the storage tank, a fluid regulation mechanism, such as an electronically controlled injector, nozzle or the like (at node 68), and a programmed dosing control unit. The dosing subsystem 32 may take various forms known in the art and may comprise commercially available components.

The SCR catalyst 38 is configured to provide a mechanism to promote a selective reduction reaction between NOx, on the one hand, and a reductant such as ammonia gas $NH_3$ (or aqueous urea, which decomposes into ammonia, $NH_3$) on the other hand. The result of such a selective reduction is, as described above in the Background, $N_2$ and $H_2O$. In general, the chemistry involved is well documented in the literature, well understood to those of ordinary skill in the art, and thus will not be elaborated upon in any greater detail. In one embodiment, the SCR catalyst 38 may comprise copper zeolite (Cu-zeolite) material, although other materials are known. See, for example, U.S. Pat. No. 6,576,587 entitled "HIGH SURFACE AREA LEAN NOx CATALYST" issued to Labarge et al., and U.S. Pat. No. 7,240,484 entitled "EXHAUST TREATMENT SYSTEMS AND METHODS FOR USING THE SAME" issued to Li et al., both owned by the common assignee of the present invention, and both hereby incorporated by reference in their entirety. In addition, as shown, the SCR catalyst 38 may be of multi-brick construction, including a plurality of individual bricks $38_1$, $38_2$ wherein each "brick" may be substantially disc-shaped. The "bricks" may be housed in a suitable enclosure, as known.

The NOx concentration sensor 40 is located upstream of the injection node 68. The NOx sensor 40 is so located so as to avoid possible interference in the NOx sensing function due to the presence of $NH_3$ gas. The NOx sensor 40, however, may alternatively be located further upstream, between the DOC 28 and the DPF 30, or upstream of the DOC 28. In addition, the exhaust temperature is often referred to herein, and for such purpose, the temperature reading from the SCR inlet temperature sensor 44 ($T_{IN}$) may be used.

The $NH_3$ sensor 60 may be located, in certain embodiments, at a mid-brick position, as shown in solid line (i.e., located anywhere downstream of the inlet of the SCR catalyst 38 and upstream of the outlet of the SCR catalyst 38). As illustrated, the $NH_3$ sensor 60 may be located at approximately the center position. The mid-brick positioning is significant. The sensed ammonia concentration level in this arrangement, even during nominal operation, is at a small yet detectable level of mid-brick $NH_3$ slip, where the downstream NOx conversion with this detectable $NH_3$ can be assumed in the presence of the rear brick, even further reducing $NH_3$ concentration levels at the tail pipe to within acceptable levels. Alternatively, in certain embodiments, the $NH_3$ sensor 60 may be located at the outlet of the SCR catalyst 38. The remainder of the sensors shown in FIG. 1 may comprise conventional components and be configured to perform in a conventional manner known to those of ordinary skill in the art.

The dosing control 80 is configured to generate the $NH_3$ Request signal that is sent to the dosing unit 36, which represents the command for a specified amount (e.g., mass rate) of reductant to be delivered to the exhaust gas stream. The dosing control 80 includes a plurality of inputs and outputs, designated 18, for interface with various sensors, other control units, etc., as described herein. Although the dosing control 80 is shown as a separate block, it should be understood that depending on the particular arrangement, the functionality of the dosing control 80 may be implemented in a separate controller, incorporated into the ECU 16, or incorporated, in whole or in part, in other control units already existing in the system (e.g., the dosing unit). Further, the dosing control 80 may be configured to perform not only control functions described herein but perform the various diagnostics also described herein as well. For such purpose, the dosing control 80 may include conventional processing apparatus known in the art, capable of executing pre-programmed instructions stored in an associated memory, all performing in accordance with the functionality described herein. That is, it is contemplated that the control and diagnostic processes described herein will be programmed in a preferred embodiment, with the resulting software code being stored in the associated memory. Implementation of the invention, in software, in view of the foregoing enabling description, would require no more than routine application of programming skills by one of ordinary skill in the art. Such a control may further be of the type having both ROM and RAM, a combination of non-volatile and volatile (modifiable) memory so that the software can be stored and yet allow storage and processing of dynamically produced data and/or signals.

The ammonia ($NH_3$) concentration sensor 60 may comprise a gas sensor as described generally in U.S. Patent Application Publication 2010/0032292 entitled "AMMONIA GAS SENSOR", the contents of which are incorporated by reference. This sensor includes a first electrode material that is sensitive to an $NH_3$ concentration in the sensed gas but which is also vulnerable to cross-interference from $NO_2$ concentration in the sensed gas. A second electrode material is also provided that has an electrochemical sensitivity to $NO_2$ that is greater than its sensitivity to $NH_3$ or NO. The disclosure of Patent Application Publication 2010/0032292 details how signals from the two sensor electrode materials can be processed to provide an improved determination of $NH_3$ concentration. While the details of this disclosure will not be repeated here, it is useful to discuss the characteristics of the disclosed sensor electrode materials as an aid to appreciating aspects of the present invention.

Figure 2:
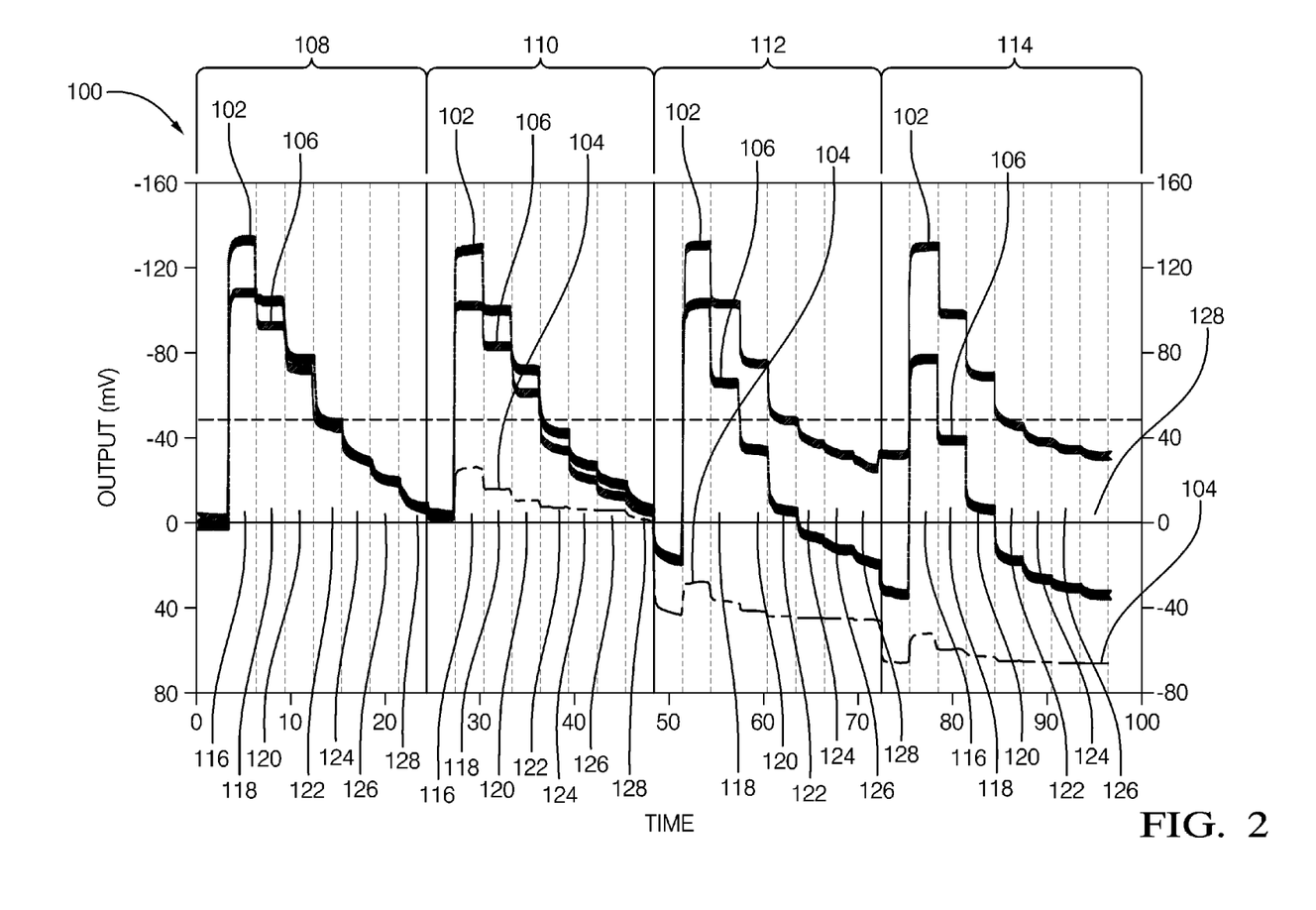
FIG. 2 is a graphical representation of the voltage across an $NH_3$ cell, the voltage across a $NO_X$ cell, and the voltage across an $NH_3$—$NO_X$ cell, at selected partial pressures of $NO_X$ and of $NH_3$ in a sample gas.

Referring to FIG. 2, a graphical representation 100 of the voltage outputs of a gas sensor is shown. The tested sensor had a $BiVO_4$ (5% MgO) $NH_3$ electrode, a $TbMg_{0.2}Cr_{0.8}O_3NO_x$ electrode, and a Pt reference electrode. The sensor was operated at 560° C. The graphical representation includes a line representing the voltage (line 102) across the $NH_3$ sensing cell, a line representing the voltage (line 104) across the $NO_x$ sensing cell, and a line 106 representing the voltage across the $NH_3$—$NO_x$ cell. The graphical representation 100 further includes four intervals representing $NO_2$ and NO concentrations: a first interval 108 where NO and $NO_2$ concentrations are 0 ppm (parts per million), a second interval 110 where NO concentration is 400 ppm and $NO_2$ concentration is 0 ppm, a third interval 112 where NO concentration is 200 ppm and $NO_2$ concentration is 200 ppm, and a fourth interval 114 where NO concentration is 0 ppm and $NO_2$ concentration is 400 ppm.

Each of the intervals 108, 110, 112, 114, include seven subsections representing $NH_3$ concentrations: a first subsection 116 where the $NH_3$ concentration is 100 ppm, a second subsection 118 where the $NH_3$ concentration is 50 ppm, a third subsection 120 where the $NH_3$ concentration is 25 ppm, a fourth subsection 122 where the $NH_3$ concentration is 10 ppm, a fifth subsection 124 where the $NH_3$ concentration is 5 ppm, a sixth subjection 126 where the $NH_3$ concentration is 2.5 ppm, and a seventh subjection 128 where the $NH_3$ concentration is 0 ppm. The remaining gas is composed of 10% $O_2$, 1.5% of $H_2O$ and balanced by $N_2$.

As shown in FIG. 2, the line 102 representing the voltage across the $NH_3$ sensing cell is identical in intervals 108 and 110 where $NO_2$ is excluded from the gas being measured. However, the voltage across the $NH_3$ sensing cell represented by line 102 has a lower value (higher absolute value) in section 112 and 114 where $NO_2$ is present, thereby demonstrating the cross-interference effect of $NO_2$ on the $NH_3$ sensing cell.

Similarly, FIG. 2 also shows the cross-interference effect of $NH_3$ on the $NO_2$ sensing cell. Within any of the intervals 110, 112, 114 where NOx is present, the line 104 representing the voltage across the NOx sensing cell shows the influence of $NH_3$ concentration as the $NH_3$ concentration is varied from 100 ppm in subsection 116 of each interval to 0 ppm in subsection 128 of each interval.

The system and method disclosed herein take advantage of these mutual cross-interference effects to enable improved fault determination of the sensors. In an aspect of the system and method of the invention, the output signals produced by each of the two electrode materials are compared to determine if the effects produced by concentrations of $NH_3$ and $NO_2$ are consistent with the known cross-interference characteristics of the electrode materials. These aspects will be further described by way examples to follow.

Figure 3:
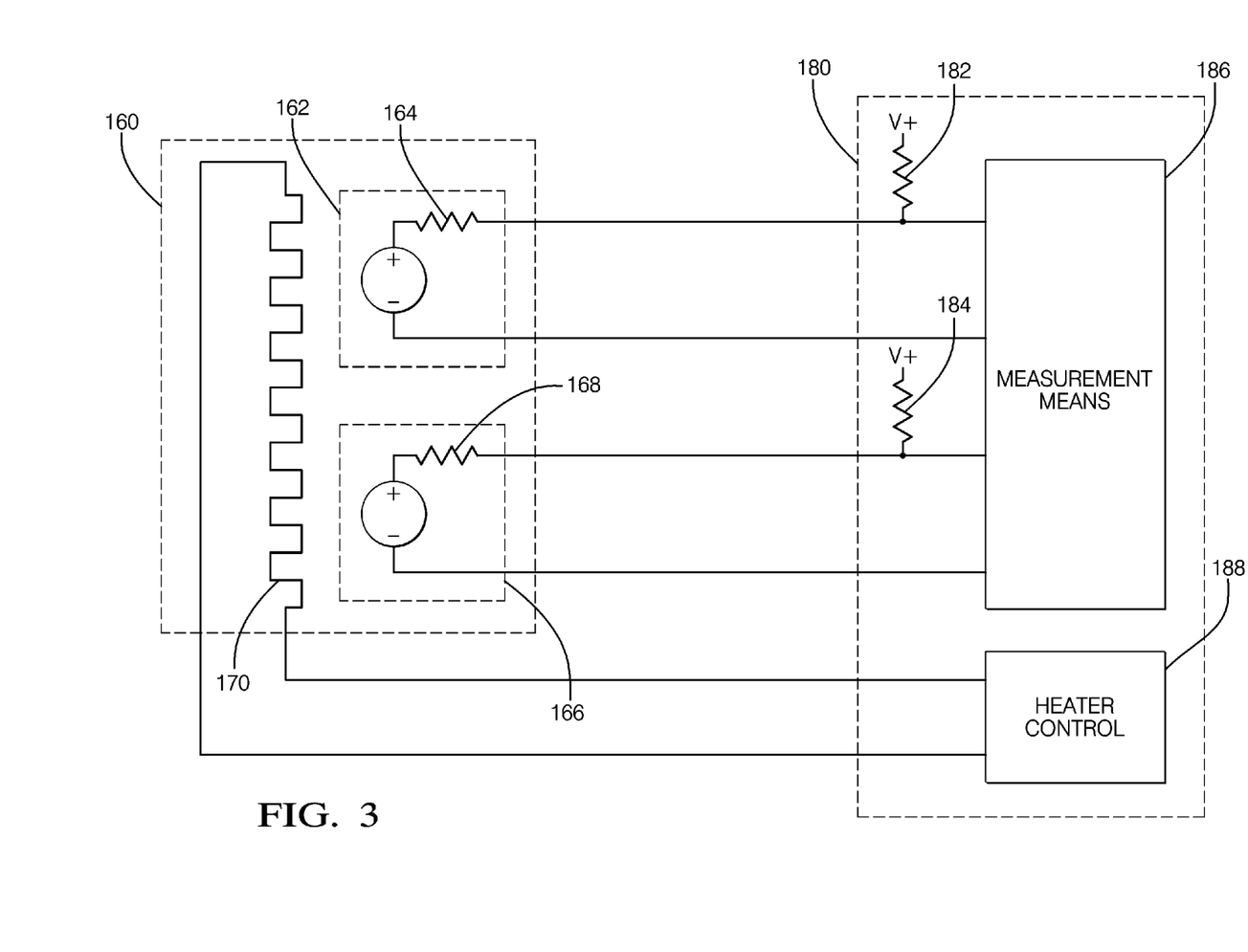
FIG. 3 is a simplified electrical schematic depicting an interface between a gas sensor and an electrical apparatus.

FIG. 3 is a schematic diagram that depicts how the sensors may be connected in a system. In FIG. 3, a sensor assembly is depicted generally as 160, with the sensor assembly 160 including a first sensing cell 162, a second sensing cell 166, and a heater 170 thermally coupled to both sensing cells 162 and 166. The sensing cell 162 produces a voltage EMF1 that is related to the concentrations of gas species, and the sensing cell 166 produces a voltage EMF2 that is related to the concentrations of gas species. The sensing cells 162 and 166 may be considered to include associated source impedances 164 and 168 respectively. Both the emf EMF1, EMF2 and the source impedance 164, 168 of a sensing cell 162, 166 are influenced by the temperature of the sensing cell, and the heater 170 is controlled to maintain the temperature of the sensing cell 162, 166 at a desired level. The sensor 160 may also include a temperature sensor (not shown) to sense a temperature produced by the heater 170. It will be appreciated that, while FIG. 3 shows two emf cells in thermal communication with a single heater, the emf cells may be contained in separate physical embodiments, and each emf cell may have its own associated heater.

Still referring to FIG. 3, the sensor 160 is electrically connected to an interface apparatus generally depicted as 180. Apparatus 180 is depicted as including a measurement means 186 to measure the voltages produced by the sensing cells 162, 166. Apparatus 180 also includes a heater control means in electrical communication with the heater 170 to maintain the heater 170 at a desired temperature. Additionally, apparatus 180 is shown as containing a first pull-up resistor 182 connected from the output of the first sensing cell 162 to a voltage source V+, and a second pull-up resistor 184 connected from the output of the second sensing cell 166 to a voltage source V+. Reference will be made to FIG. 3 in the discussion of the following examples.

Example 1

Sensor Rationality Test during Reductant Dosing

A first diagnostic method may be used during intervals when reductant is being added to the exhaust gas, e.g. when a urea solution is being injected. During such a time interval, the gas to which the exhaust sensor is exposed will have a relatively high concentration of $NH_3$. As illustrated in FIG. 2, both the $NH_3$ sensing cell (whose output is shown in trace 102) and the NOx sensing cell (whose output is shown in trace 104) are influenced by the concentration of $NH_3$ in the sensed gas. In the discussion that follows, the output of the $NH_3$ sensing cell will be denoted as EMF1, and the output of the NOx sensing cell will be denoted as EMF2.

Figure 4:
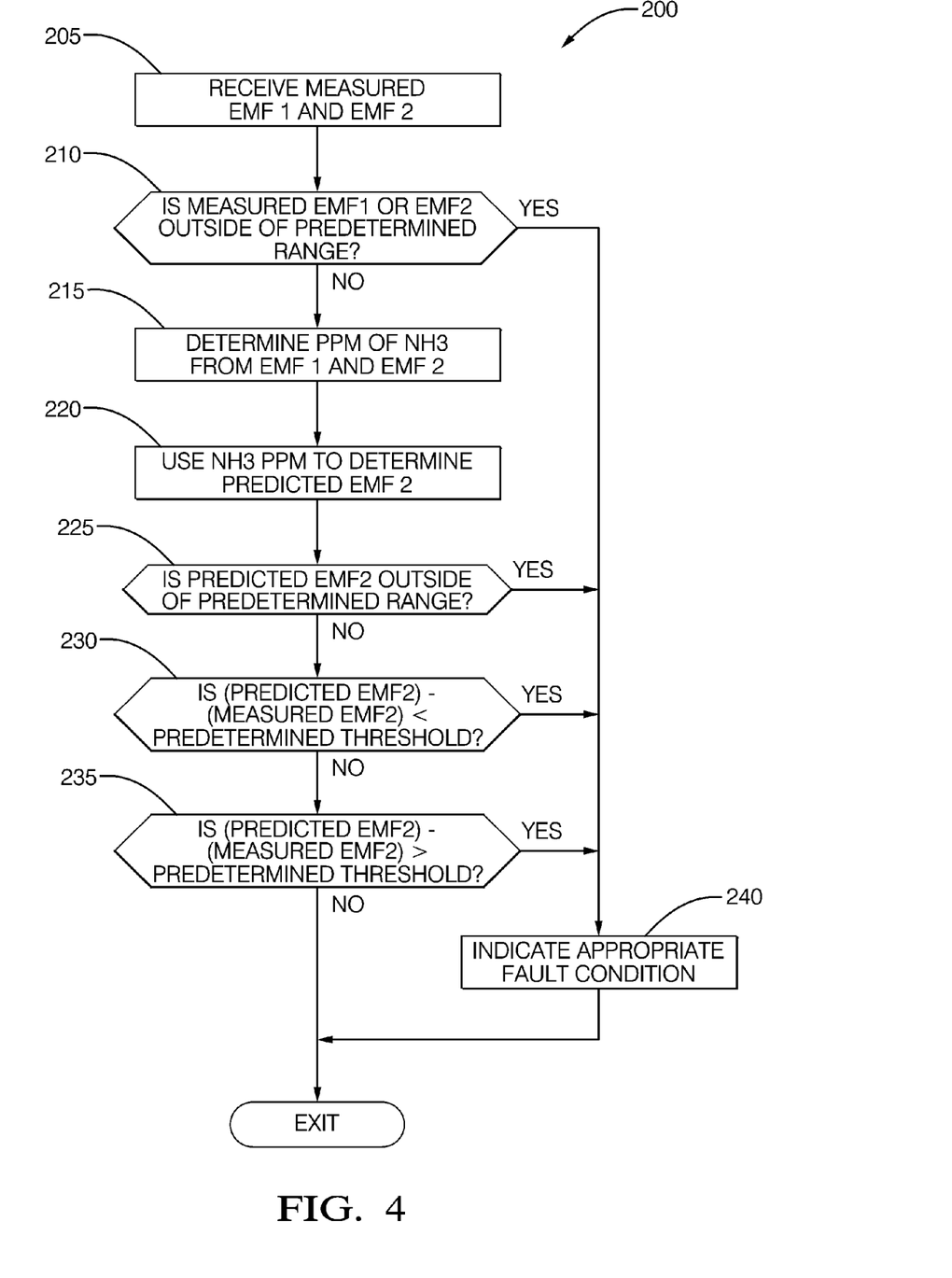
FIG. 4 is a flow chart of a first diagnostic method incorporating aspects of the present invention.

Referring to FIG. 4, the first diagnostic method 200 includes the step 205 of receiving EMF1 and EMF2 values from the $NH_3$ sensing cell and the NOx sensing cell respectively. In decision step 210, the measured values of EMF1 and EMF2 received in step 205 are each compared to a predetermined range for the respective sensor. As will be appreciated from FIG. 3, a value of EMF1 measured during reductant dosing that is too low may be an indication of a short circuit across or other damage to sensing cell 162. A value of EMF2 measured during reductant dosing that is too low may be an indication of a short circuit across or other damage to sensing cell 166. A measured value of EMF1 or EMF2 that is too high may be the result of a high impedance in sensing cell 162 or 166 as may be caused by a damaged sensor or improper operation of heater 170 or heater control 188. A high measured value of EMF1 may also be the result of an open conductor or connector in the circuit between measurement means 186 and sensing cell 162, resulting in measurement means 186 receiving V+ through pull-up resistor 182. A high measured value of EMF2 may also be the result of an open conductor or connector in the circuit between measurement means 186 and sensing cell 166, resulting in measurement means 186 receiving V+ through pull-up resistor 184. If EMF1 and/or EMF2 stay at a constant value in excess of a predetermined amount of time, this may be an indication that the sensing cells 162 and/or 166 may be isolated from the exhaust gas, for example because of a sensor shield or coating layer being plugged by soot or by chemicals that are poisonous to the sensor. If the result of decision step 220 is that the measured value of EMF1 and/or EMF2 is outside a predetermined range, the process flow proceeds to step 240.

In step 215, the concentration of $NH_3$ is determined from the received values of EMF1 and EMF2. The concentration of $NH_3$ may be determined based on a calculation involving a predetermined characteristic equation relating EMF1 and EMF2 to $NH_3$ concentration. An exemplary characteristic equation is disclosed in U.S. patent application Ser. No. 12/974,266 titled "METHOD AND DEVICE FOR CHARACTERIZATION AND SENSING OF EXHAUST GAS AND CONTROL OF ENGINES AND COMPONENTS FOR AFTERTREATMENT OF EXHAUST GASES" filed Dec. 21, 2010, the contents of which are hereby incorporated by reference. Alternatively, the concentration of $NH_3$ may be determined in step 215 by means of a lookup table that uses EMF1 and EMF2 as inputs.

In step 220, the concentration of $NH_3$ that was determined in step 215 is used to determine a predicted EMF2 value, based on a predetermined relationship describing the sensitivity of the NOx sensing cell to $NH_3$ concentration. The predicted value of EMF2 may be determined based on a calculation based on a predetermined mathematical model for the NOx sensing cell that relates EMF2 to $NH_3$ concentration. Alternatively, the predicted value of EMF2 may be determined by means of a table look-up using $NH_3$ concentration as an input.

Still referring to FIG. 4, the method includes a further sequence of decision steps 225, 230, and 235. Step 225 compares the predicted value of EMF2 based on the $NH_3$ concentration to a predetermined range. If the predicted value of EMF2 is outside of the predetermined range, this is indicative of degradation of one or both of sensing cells 162, 166, such as may result from cell aging or poisoning. If the result of decision step 225 is that the predicted value of EMF2 is outside a predetermined range, the process flow proceeds to step 240.

If the test in step 225 does not indicate a fault condition, the method continues to step 230. In this step, the difference (predicted value of EMF2—measured value of EMF2) is compared to a predetermined threshold. If this difference is below the threshold, this may be an indication of a malfunction in the $NH_3$ sensing cell, resulting in an underestimation of $NH_3$ concentration in step 210 and a corresponding underestimation of the predicted value of EMF2 in step 215. If a malfunction is indicated, the method proceeds to step 240.

If the test in step 230 does not indicate a fault condition, the method continues to step 235. In this step, the difference (predicted value of EMF2—measured value of EMF2) is compared to a predetermined threshold. If the difference is above this threshold, this may be an indication of a malfunction in the NOx sensing cell, resulting in the cell not exhibiting the cross-influence effect to $NH_3$ that is known to be a characteristic of the NOx sensing cell. If a malfunction is indicated by step 230, the method proceeds to step 240. If no malfunction is detected, the diagnostic routine 200 is exited.

Step 240 in method 200 is entered upon detection of a fault condition by any of the decision steps 220, 225, 230, or 235. Step 240 indicates the appropriate fault condition. The response of the system to a fault condition may depend on the nature of the fault condition. For example, a diagnostic trouble code (DTC) may be set and/or a malfunction indicator lamp (MIL) may be illuminated. Depending on the nature of the fault condition, control of the engine or exhaust treatment systems may be changed to a failsafe backup mode to preserve driveability and/or to prevent damage to other components.

Example 2

Sensor Rationality Test during Intervals of No Reductant Dosing

A second diagnostic method may be executed during times when no reductant is being added to the exhaust gas. During such a time interval, the gas to which the exhaust sensor is exposed will contain a substantial quantity of $NO_2$ which may be predetermined by engine mapping or by direct measurement, and will contain essentially zero $NH_3$. Again, in the discussion that follows, the output of the $NH_3$ sensing cell will be denoted as EMF1, and the output of the NOx sensing cell will be denoted as EMF2.

Referring again to FIG. 2, it will be appreciated that under conditions of negligible $NH_3$ (as seen in subsections 128 in intervals 108, 110, 112, and 114), EMF1 (shown as line 102) shows appreciable sensitivity to $NO_2$ concentration. Recall that intervals 108 and 110 represent conditions in which $NO_2$ is excluded from the gas being measured, interval 112 represents 200 ppm $NO_2$, and interval 114 represents 400 ppm $NO_2$. An aspect of the present invention takes advantage of this cross-interference effect of $NO_2$ on the $NH_3$ sensing cell at low $NH_3$ levels to provide additional diagnostic information.

Figure 5:
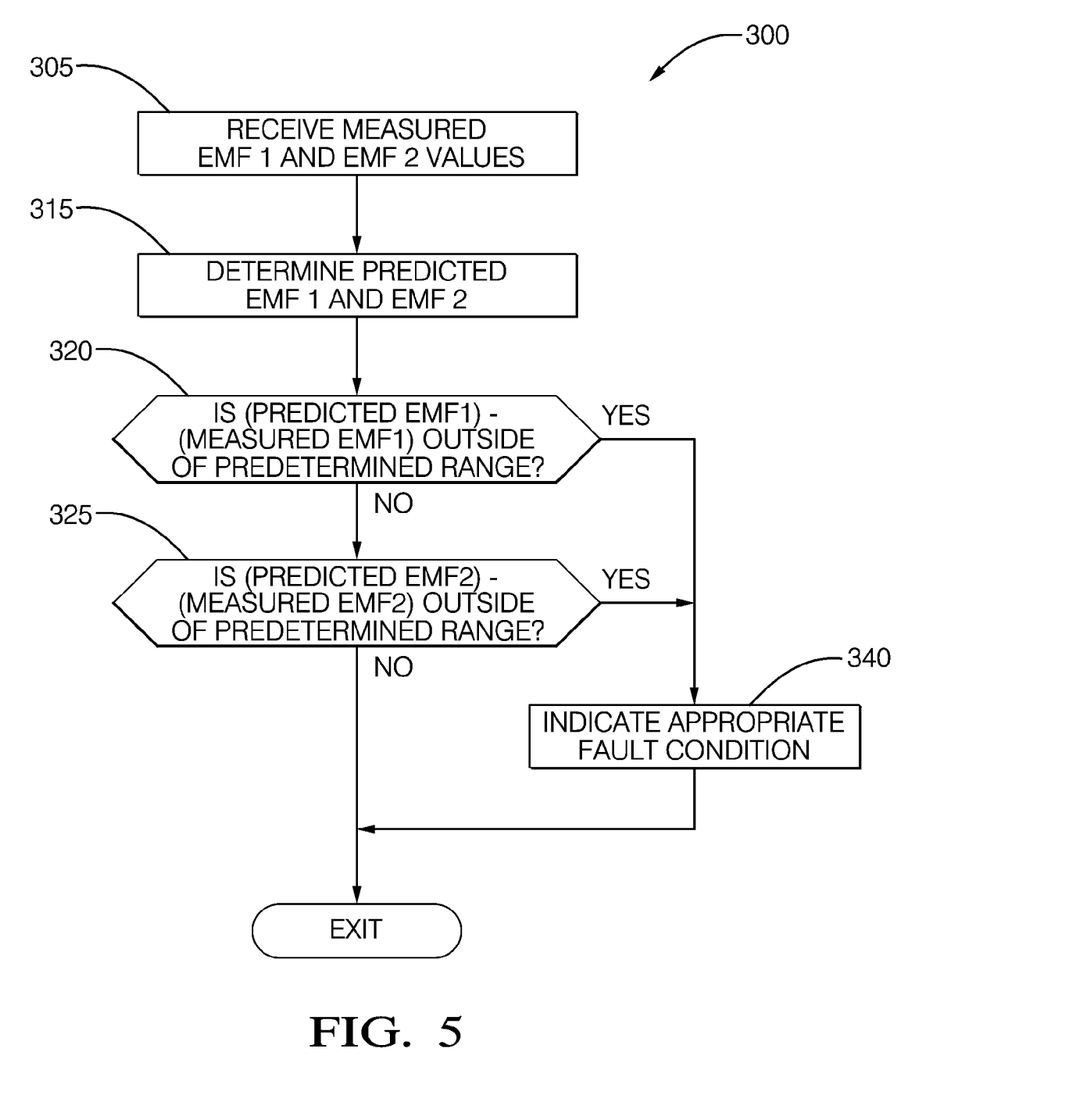
FIG. 5 is a flow chart of a second diagnostic method incorporating aspects of the present invention.

Referring to FIG. 5, the second diagnostic method 300 includes the step 305 of receiving EMF1 and EMF2 values from the $NH_3$ sensing cell and the NOx sensing cell respectively.

In step 315, predicted values of EMF1 and EMF2 are determined. The determination of predicted values of EMF1 and EMF2 may be based on predetermined engine mapping information relating the levels of NO and $NO_2$ in the exhaust to the engine operating conditions. Alternately, predicted values of EMF1 and EMF2 may be determined based on measured NOx levels from another sensor such as, for example, sensor 40 in FIG. 1. The determination of predicted values of EMF1 and EMF2 may further be based on predetermined sensor characterization relating EMF1 and EMF2 to levels of NO and $NO_2$ in the exhaust. The determination of predicted values of EMF1 and EMF2 may be accomplished by means of look-up tables, calculations utilizing equations, or a combination thereof. Alternatively, the measured values of EMF1 and EMF2 may be utilized to calculate NO and $NO_2$ (NOx) based on a predetermined sensor model. The calculated NO and $NO_2$ (NOx) may be compared with predicted values of NO and $NO_2$ NOX) based on predetermined engine mapping, or with another NOx sensor such as sensor 40.

Step 320 in method 300 compares the predicted value of EMF1 determined in step 315 to the measured value of EMF1 received in step 305. If the difference between the predicted and measured values is outside of a predetermined range, this is indicative of a fault condition. For example, a measured value of EMF1 that is significantly less than the predicted value of EMF1 may indicate a short circuit across or other damage to sensing cell 162. A lower than predicted value of EMF1 may also result from thermal damage (meltdown) or chemical poisoning of sensing cell 162.

A measured value of EMF1 that is significantly greater than the predicted value of EMF1 may be indicative of a high impedance in sensing cell 162 as may be caused by a damaged sensing cell 162 or improper operation of heater 170 or heater control 188. A higher than predicted value of EMF1 may also be the result of an open conductor or connector in the circuit between measurement means 186 and sensing cell 162, resulting in measurement means 186 receiving V+ through pull-up resistor 182. If the result of decision step 320 is that the measured value of EMF1 differs from the predicted value of EMF1 in excess of a predetermined amount, the process flow proceeds to step 340.

If the test of EMF1 in step 320 does not indicate a fault condition, step 325 performs a similar test on EMF2 by comparing the predicted value of EMF2 determined in step 315 to the measured value of EMF2 received in step 305. If the difference between the predicted and measured values is outside of a predetermined range, this is indicative of a fault condition. For example, a measured value of EMF2 that is significantly less than the predicted value of EMF2 may indicate a short circuit across or other damage to sensing cell 166. A lower than predicted value of EMF2 may also result from thermal damage (meltdown) or chemical poisoning of sensing cell 166.

A measured value of EMF2 that is significantly greater than the predicted value of EMF2 may be indicative of a high impedance in sensing cell 166 as may be caused by a damaged sensing cell 166 or improper operation of heater 170 or heater control 188. A higher than predicted value of EMF2 may also be the result of an open conductor or connector in the circuit between measurement means 186 and sensing cell 166, resulting in measurement means 186 receiving V+ through pull-up resistor 184. If the result of decision step 325 is that the measured value of EMF1 differs from the predicted value of EMF1 in excess of a predetermined amount, the process flow proceeds to step 340. If no malfunction is detected, the diagnostic routine 300 is exited Step 340 in method 300 is entered upon detection of a fault condition by either of the decision steps 320 or 325. Step 340 indicates the appropriate fault condition. The response of the system to a fault condition may depend on the nature of the fault condition. For example, a diagnostic trouble code (DTC) may be set and/or a malfunction indicator lamp (MIL) may be illuminated. Depending on the nature of the fault condition, control of the engine or exhaust treatment systems may be changed to a failsafe backup mode to preserve driveability and/or to prevent damage to other components.

In the foregoing examples, the indicated orders of the steps of the method are for illustration purposes only. One skilled in the art will appreciate that certain steps may be performed in different orders without departing from the inventive concepts disclosed herein. While this invention has been described in terms of the embodiments thereof, it is not intended to be so limited, but rather only to the extent set forth in the claims that follow.

The invention claimed is:

1. A method for fault identification of gas sensors configured to measure concentrations of gas species in a gas mixture, comprising the steps of:

receiving a first output signal from a first gas sensor having an output that varies according to both the concentration of a first gas species in the gas mixture and the concentration of a second gas species in the gas mixture;

receiving a second output signal from a second gas sensor having an output that varies according to both the concentration of the first gas species in the gas mixture and the concentration of the second gas species in the gas mixture;

processing the first output signal and the second output signal in a diagnostic controller that implements a model of the first gas sensor and a model of the second gas sensor so as to identify a fault in the first gas sensor or the second gas sensor; and indicating any identified faults;

wherein the gas mixture comprises an exhaust gas from an internal combustion engine having an exhaust system comprising means for controllably introducing ammonia into the gas mixture, and wherein the first gas species is $NH_3$ and the second gas species is $NO_x$; and wherein the processing of the first output signal and the second output signal includes the steps of:

using the first output signal and the second output signal as inputs to the model to calculate the concentration of the first gas species in the gas mixture;

using the calculated concentration of the first gas species as an input to the model of the second gas sensor to calculate a predicted signal level from the second gas sensor;

indicating a first fault condition if the second output signal is not within a first predetermined range;

indicating a second fault condition if the predicted signal level is not within a second predetermined range;

indicating a third fault condition if the difference between the second output signal and the predicted signal level is not within a third predetermined range.

2. The method of claim 1 wherein the first output signal and the second output signal are measured at a time when the means for controllably introducing ammonia into the gas mixture is controlled so as to introduce ammonia into the gas mixture.

3. The method of claim 2 wherein at least one of the first predetermined range, the second predetermined range, and the third predetermined range is a function of the operating state of the internal combustion engine.

4. The method of claim 1 wherein the processing of the first output signal and the second output signal further includes the steps of:

indicating a fourth fault condition if the first output signal is not within a first predetermined range;

indicating a fifth fault condition if the second output signal is not within a second predetermined range.

5. The method of claim 4 wherein the first output signal and the second output signal are measured at a time when the means for controllably introducing ammonia into the gas mixture is controlled so as to prevent the introduction of ammonia into the gas mixture.

6. The method of claim 5 wherein at least one of the first predetermined range and the second predetermined range is a function of the operating state of the internal combustion engine.

7. The method of claim 1 wherein the step of indicating any identified faults comprises generating a signal operable to control an output device.

8. The method of claim 7 wherein the output device is a visual indicator or a memory storage device.

9. A fault identification system for gas sensors configured to measure concentrations of gas species in a gas mixture a gas mixture, comprising:

a first gas sensor providing an output that varies according to both the concentration of a first gas species in the gas mixture and the concentration of a second gas species in the gas mixture;

a second gas sensor providing an output that varies according to both the concentration of the first gas species in the gas mixture and the concentration of the second gas species in the gas mixture;

a diagnostic controller that is coupled to said first gas sensor and said second gas sensor that implements a model of the first gas sensor and a model of the second gas sensor so as to identify a fault in the first gas sensor or the second gas sensor, the diagnostic controller including a non-transitory computer readable medium containing instructions that, when executed, cause the diagnostic controller to:

use the first output signal and the second output signal as inputs to the model to calculate the concentration of the first gas species in the gas mixture;

use the calculated concentration of the first gas species as an input to the model of the second gas sensor to calculate a predicted signal level from the second gas sensor;

indicate a first fault condition if the second output signal is not within a first predetermined range;

indicate a second fault condition if the predicted signal level is not within a second predetermined range; and indicate a third fault condition if the difference between the second output signal and the predicted signal level is not within a third predetermined range.

10. The system of claim 9 wherein the first gas species is $NH_3$ and the second gas species is $NO_x$.

11. The system of claim 9 wherein the diagnostic controller is configured to indicate the first fault condition, the second fault condition, and the third fault condition by generating a signal operable to control an output device.

12. The system of claim 11 wherein the output device is a visual indicator or a memory storage device.

13. A method for fault identification of gas sensors configured to measure concentrations of gas species in a gas mixture, comprising the steps of:

receiving a first output signal from a first gas sensor having an output that varies according to both the concentration of a first gas species in the gas mixture and the concentration of a second gas species in the gas mixture;

receiving a second output signal from a second gas sensor having an output that varies according to both the concentration of the first gas species in the gas mixture and the concentration of the second gas species in the gas mixture;

processing the first output signal and the second output signal in a diagnostic controller that implements a model of the first gas sensor and a model of the second gas sensor so as to identify a fault in the first gas sensor or the second gas sensor, wherein the processing of the first output signal and the second output signal includes the steps of:

using the first output signal and the second output signal as inputs to the model to calculate the concentration of the first gas species in the gas mixture;

using the calculated concentration of the first gas species as an input to the model of the second gas sensor to calculate a predicted signal level from the second gas sensor;

indicating a first fault condition if the second output signal is not within a first predetermined range;

indicating a second fault condition if the predicted signal level is not within a second predetermined range;

indicating a third fault condition if the difference between the second output signal and the predicted signal level is not within a third predetermined range; and indicating any identified faults.

14. The method of claim 13 wherein the step of indicating a first fault condition, the step of indicating a second fault condition, and the step of indicating a third fault condition each comprises generating a signal operable to control an output device.

15. The method of claim 14 wherein the output device is a visual indicator or a memory storage device.

* * * * *